(12) United States Patent
Gerum et al.

(10) Patent No.: US 8,371,275 B2
(45) Date of Patent: Feb. 12, 2013

(54) COMPRESSED AIR SYSTEM

(75) Inventors: Eduard Gerum, Rosenheim (DE); Mathias Mayr, Germering (DE); Huba Németh, Budapest (HU); Michael Herges, Muenchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 440 days.

(21) Appl. No.: 12/686,956

(22) Filed: Jan. 13, 2010

(65) Prior Publication Data

US 2010/0147271 A1 Jun. 17, 2010

Related U.S. Application Data

(63) Continuation of application No. PCT/EP2008/006126, filed on Jul. 25, 2008.

(30) Foreign Application Priority Data

Jul. 25, 2007 (DE) .................. 10 2007 035 163

(51) Int. Cl.
    *F02B 33/00* (2006.01)
(52) U.S. Cl. ..................... 123/559.1; 60/611
(58) Field of Classification Search .............. 60/611
    See application file for complete search history.

(56) References Cited

U.S. PATENT DOCUMENTS

| 4,162,668 A * | 7/1979 | Jacob et al. ............. 123/179.31 |
| 4,714,483 A * | 12/1987 | Koening et al. ................. 96/113 |
| 5,064,423 A | 11/1991 | Lorenz et al. |
| 7,665,302 B2 * | 2/2010 | Nemeth et al. ............... 60/605.1 |
| 7,762,069 B2 * | 7/2010 | Gerum .......................... 60/611 |
| 2008/0066467 A1 * | 3/2008 | Nemeth et al. ................ 60/606 |
| 2011/0041496 A1 * | 2/2011 | Mayr ............................. 60/611 |

FOREIGN PATENT DOCUMENTS

| CN | 2124160 U | 12/1992 |
| DE | 37 37 743 A1 | 5/1989 |
| DE | 39 06 312 C1 | 12/1989 |
| DE | 195 44 621 C1 | 1/1997 |
| DE | 10 2006 008 783 A1 | 9/2006 |
| DE | 102 24 719 B4 | 3/2007 |
| EP | 0 776 807 B1 | 6/1997 |
| EP | 1 508 488 A1 | 2/2005 |
| EP | 1 956 213 A1 | 8/2008 |
| WO | WO 2007/060274 A1 | 5/2007 |

OTHER PUBLICATIONS

German Office Action dated Mar. 27, 2008 including English translation (Six (6) pages).
International Search Report dated Oct. 20, 2008 including English translation (Four (4) pages).
Chinese Office Action dated Sep. 14, 2011 (Six (6) pages).

* cited by examiner

*Primary Examiner* — Thomas Denion
*Assistant Examiner* — Cameron Setayesh
(74) *Attorney, Agent, or Firm* — Crowell & Moring LLP

(57) ABSTRACT

A compressed-air system for supplying a compress-air injection module of a turbocharged internal combustion engine and the pneumatic systems of the vehicle comprises a compressor is provided. The compressor is connected via a line to a pressure accumulator for the supply of a compressed-air injection module and to a device for compressed-air preparation having an air dryer and a pressure regulator for supplying pressure circuits for compressed-air-actuated consumers. The line for supplying the compressed-air injection module branches off upstream of the device for compressed-air preparation.

10 Claims, 1 Drawing Sheet

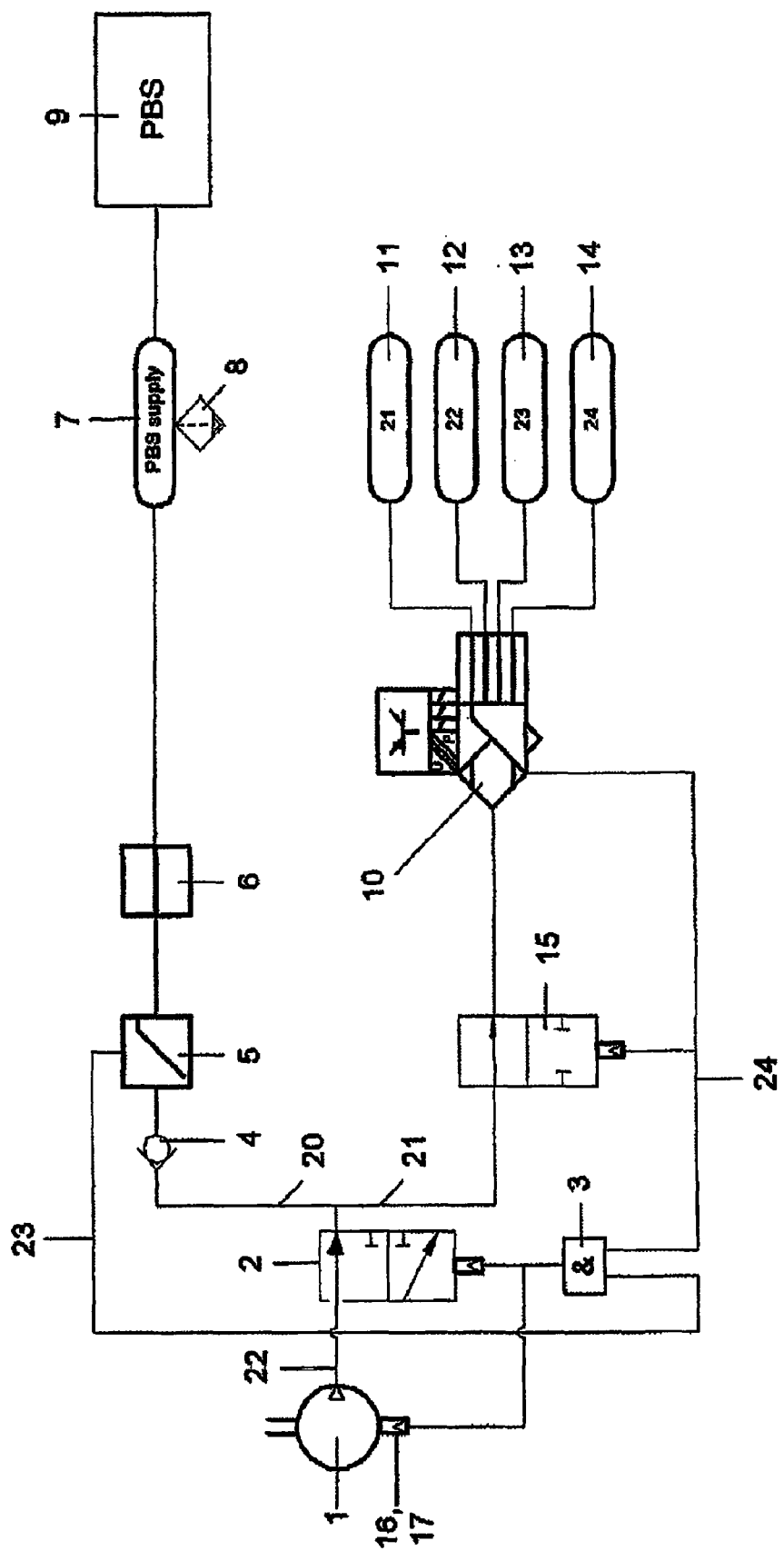

COMPRESSED AIR SYSTEM

CROSS-REFERENCE TO RELATED APPLICATIONS

This application is a continuation of PCT International Application No. PCT/EP2008/006126, filed Jul. 25, 2008, which claims priority under 35 U.S.C. §119 from German Patent Application No. DE 10 2007 035 163.3, filed Jul. 25, 2007, the entire disclosures of which are herein expressly incorporated by reference.

BACKGROUND AND SUMMARY OF THE INVENTION

The present invention relates to a compressed air system for supplying a turbo-charged internal combustion engine. A compressor is connected to a reservoir vessel for supplying a compressed air blowing-in module, and a compressed air-conditioning device with an air dryer and a pressure regulator is provided for supplying pressure vessels for compressed-air-activated consumers.

German patent document no. DE 10 2006 008 783 discloses a fresh gas supply device for a turbo-charged turbo internal combustion engine. In said engine, a compressor is operated which has an air dryer arranged downstream of it in order to feed the dried air to a pressure chamber. The air dryer is continuously in operation when the compressor is operating, which entails comparatively high expenditure, in particular because the air to be dried consumes, in turn, approximately 10% of the quantity of air on regenerating the desiccant. Such a compressed air system can therefore be optimized in terms of installation space, weight and consumption.

Although an air dryer is necessary only to a limited degree for a compressed air blowing-in module for a turbo-charged internal combustion engine, if the compressed air is also to be used to operate other compressed air consumers such as a brake system, air suspension system and secondary consumers, an air dryer is important in order to avoid the pressure vessels and lines being filled with water, in particular because this can result in problems due to the formation of ice and corrosion.

An object of the present invention is therefore to provide a compressed air system for supplying a turbo-charged piston internal combustion engine whose operation is configured in an optimized and flexible way.

According to the invention, in the compressed air system the line for filling the reservoir vessel for supplying a compressed air blowing-in module is branched off upstream of the compressed air-conditioning device in the direction of flow of the air. As a result, although the compressor supplies both the reservoir vessel for supplying a compressed air blowing-in module and the compressed air-conditioning device, the supply is however via separate lines so that variable operation of the compressed air system is made possible. In particular, the entire quantity of air is no longer fed to the compressed air-conditioning device.

The compressor is connected via a first line to the pressure vessel for supplying a compressed air blowing-in module, and via a second line to the pressure vessels for compressed-air-activated consumers. By dividing the compressed air from the compressor into two lines it is possible optionally to make available a supply with compressed air to the compressed air blowing-in module and/or the pressure vessels for compressed-air-activated consumers. However, the duration of the compressed air supply can be adjusted individually.

According to one preferred embodiment of the invention, at least one switchable valve is provided in a line between the compressor and the compressed air-conditioning device in order to switch off the compressed air supply when the pressure vessels for compressed-air-activated consumers are sufficiently filled. As a result, the conditioning of the compressed air can be carried out whenever the corresponding pressure vessels are to be filled. If the pressure vessels are filled, the compressed air-conditioning device with the air dryer can be switched off, with the result that the air dryer can run through a regeneration phase. This procedure is particularly efficient because the high degree of consumption of energy for drying the air has to take place only in certain phases of the operation of the compressed air system and regeneration of an air dryer cartridge is made possible.

In order to avoid a backflow in the line to the compressed air blowing-in module, a non-return valve can be arranged upstream of the pressure-limiting valve. A backflow is avoided in particular when the venting valve is switched.

A first control signal is preferably generated by corresponding pressure sensors if a maximum pressure is reached downstream of the non-return valve, and a second control signal is generated if a predetermined maximum pressure is reached in the line for supplying the compressed air-conditioning device. In addition, a logic switching device can be provided which generates a third control signal if the first and second control signals are present. This makes it possible to actuate, preferably by the third control signal, a venting valve which is arranged in a feed line of the compressor, in particular upstream of the branching of the lines. Alternatively it is possible to use the third control signal to actuate a valve of an energy-saving system by which the compressor can be switched off.

A pressure-limiting valve is preferably arranged in the line between the compressor and the pressure vessel for supplying a compressed air blowing-in module. This ensures that when a predetermined pressure is exceeded, the compressor and/or a venting valve can be switched off, in particular if the compressed air blowing-in module no longer requires any compressed air.

According to a further embodiment of the invention, the venting valve is arranged in a feed line of the compressor upstream of a branching of the lines to the compressed air blowing-in module and the pressure vessels for compressed-air-activated consumers and is of switchable design. The switching is preferably carried out using control signals which are generated by the pressure-limiting valve and the switchable valve upstream of the compressed air-conditioning device. In particular, the venting valve can be switched off automatically if the overpressure valve closes and the compressed air-conditioning device no longer requires any compressed air. It is possible for this, for example, to provide a logic valve for switching the venting valve.

An overflow valve which has a higher opening pressure than at least one pressure vessel for compressed-air-activated consumers is preferably provided in the line to the compressed air blowing-in module downstream of the pressure-limiting valve. As a result, the filling sequence of the pressure vessels can be predefined.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a pressure circuit diagram of a compressed air system according to an embodiment of the invention.

DETAILED DESCRIPTION OF THE DRAWING

The compressed air system comprises a compressor 1 which sucks in fresh air and is driven, for example, by means of an internal combustion engine. The compressor 1 is connected via a feed line 22 to a venting valve 2 downstream of which a branching junction is provided, which divides into a first line 20 and a second line 21.

The first line 20 is used to supply a reservoir vessel 7 for supplying a compressed air blowing-in module 9, in particular for an internal combustion engine. In this context, a non-return valve 4, which is arranged upstream of a pressure-limiting valve 5, is provided downstream of the venting valve 2 in the line 20. An overflow valve 6 is provided downstream of the pressure-limiting valve 5. An automatic dewatering valve 8 is connected to the pressure vessel 7 in order to permit moisture to be carried away to a certain degree.

The second line 21 is connected via a switchable valve 15 to a compressed air-conditioning device 10 which has an air dryer and a pressure regulator for supplying individual pressure vessels 11 to 14. In this context, the pressure vessels 11 and 12 can be used for a service brake circuit, which circuits have compressed-air-activated consumers. The pressure vessel 13 may serve, for example, to operate a parking brake or a trailer. The pressure vessel 14 can be used to operate other secondary consumers, for example a clutch. The pressure vessels 11 to 14 can be used, in particular, on a utility vehicle for a brake system.

During operation, the compressor 1 feeds compressed air to the lines 20 and 21 via the venting valve 2. If the demand for air pressure at the first line 20 is no longer present and a predetermined maximum pressure is reached downstream of the pressure-limiting valve 5, the pressure-limiting valve 5 switches off and a first control signal is output via a control line 23 to a logic valve 3, preferably with an AND function. The non-return valve 4 prevents the compressed air from flowing back.

If the compressed air-conditioning device 10 with the pressure regulator on the second line 21 detects that the pressure vessels 11 to 14 no longer require any compressed air and a predetermined maximum pressure has been reached the switchable valve 15 is switched off using a control signal, and a second control signal is sent to the logic valve 3 via a control line 24.

If, therefore, both a first control signal is generated by the pressure-limiting valve 5 and a second control signal is generated by the compressed air-conditioning device 10, the logic valve 3 generates a third control signal, which then also switches off the venting valve 2. As a result, compressed air is extracted only in cases in which the suppliers also require corresponding compressed air. The logic valve 3 as a switching device can process control signals in the form of pneumatic pressures. It is also possible to use control signals in the form of electrical signals.

Optionally, the compressor 1 or a drive or power supply of the compressor 1 can then also be switched off. A valve 16 or a clutch 17 is provided as switching device on the compressor 1, by means of which valve 16 or clutch 17 the compressor 1 can be switched off when the third control signal is present.

In order to fill the pressure vessels 11 to 14 in a specific sequence, the overflow valve 6 on the first line 20 can be set to a certain opening pressure. The opening pressure can be higher than the pressure for filling the pressure vessels 11 and 12 for the service brake circuits, with the result that at first the pressure vessels 11 and 12 are filled and then the overflow valve 6 opens as the pressure rises further, and only then is there a supply to the reservoir vessel 7.

By switching off the compressed air supply it is possible to regenerate the air dryer at the compressed air-conditioning device, in particular if said air dryer is switched on only in certain intervals, which increases the efficiency of the compressed air system.

In the compressed air system according to the invention it is possible to integrate the valves 2, 4, 5, 6 and 15 into a common module, which can also be coupled to a controller. In addition, it is possible to provide a heating cartridge on the compressed air blowing-in module 9 in order, in particular, to avoid freezing up in this region.

Instead of the illustrated logic valve 3, the function of controlling the venting valve and the switchable valve 15 can also be performed by an external controller which receives and outputs corresponding switching signals.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressed air system according for supplying a turbo-charged internal combustion engine, comprising:
    a compressor;
    a reservoir vessel for supplying a compressed air blowing-in module, the reservoir vessel being connected via a first line to the compressor; and
    a compressed air-conditioning device with an air dryer and a pressure regulator for supplying at least one pressure vessel for compressed-air-activated consumers,
    wherein
        the first line for filling the reservoir vessel for supplying the compressed air blowing-in module is branched off upstream of the compressed air-conditioning device, and
        at least one switchable valve is provided in a second line between the compressor and the compressed air-conditioning device, the at least one switchable valve being configured to switch off compressed air supply when the at least one pressure vessel for compressed-air-activated consumers is filled with a predetermined amount of compressed air.

2. A compressed air system for supplying a turbo-charged internal combustion engine, comprising:
    a compressor;
    a reservoir vessel for supplying a compressed air blowing-in module, the reservoir vessel being connected via a first line to the compressor; and
    a compressed air-conditioning device with an air dryer and a pressure regulator for supplying at least one pressure vessel for compressed-air-activated consumers,
    wherein
        the first line for filling the reservoir vessel for supplying the compressed air blowing-in module is branched off upstream of the compressed air-conditioning device,
        a non-return valve is provided in the first line for filling the reservoir vessel for supplying a compressed air blowing-in module, and
        a first control signal is generated if a predetermined maximum pressure is reached downstream of the non-return valve or of a further valve, and a second control signal is generated if a predetermined maximum pressure is reached in the second line for supplying the compressed air-conditioning device.

3. The compressed air system according to claim 2, further comprising:
   a logic switching device, wherein the logic switching device is configured to generate a third control signal when the first and second control signals are present.

4. The compressed air system according to claim 3, wherein the control signals are generated as pneumatic pressures.

5. The compressed air system according to claim 3, wherein the control signals are electrical signals.

6. The compressed air system according to claim 3, further comprising:
   a switchable venting valve arranged in a feed line from the compressor at a position upstream of the first line and the second line.

7. The compressed air system according to claim 6, further comprising:
   at least one of a compressor output shut-off valve and a clutch arranged to shut off output from the compressor when the third control signal is present.

8. The compressed air system according to claim 7, further comprising:
   a pressure-limiting valve located between the compressor and the reservoir vessel in the first line, the pressure-limiting valve being configured to interrupt compressed air delivery to the reservoir vessel when a predefined pressure is reached.

9. The compressed air system according to claim 8, further comprising:
   an overflow valve located in the first line upstream of the reservoir vessel, wherein the overflow valve is configured to have a higher opening pressure than predetermined pressures corresponding to a filled state of at least one of the at least one pressure vessel for compressed-air-activated consumers.

10. The compressed air system according to claim 1 wherein the reservoir vessel for supplying a compressed air blowing-in module is equipped with a dewatering valve.

\* \* \* \* \*